United States Patent
Herbelleau et al.

(10) Patent No.: US 7,032,638 B2
(45) Date of Patent: Apr. 25, 2006

(54) TIRE WITH A PROTECTIVE CROWN PLY MADE OF VERY HIGH TWIST ARAMID FIBER

(75) Inventors: Yves Herbelleau, Carqueiranne (FR); Hubert Pacherie, Clermont-Ferrand (FR); Jean-Luc Guerbert-Jubert, Luxeuil-les-Bains (FR); Philippe Esnault, Greensville, SC (US)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 458 days.

(21) Appl. No.: 10/349,632

(22) Filed: Jan. 22, 2003

(65) Prior Publication Data

US 2003/0155060 A1  Aug. 21, 2003

Related U.S. Application Data

(63) Continuation of application No. PCT/EP01/08430, filed on Jul. 20, 2001.

(30) Foreign Application Priority Data

Jul. 24, 2000  (FR) .................................. 00 09699

(51) Int. Cl.
*B60C 9/20* (2006.01)
*B60C 9/22* (2006.01)

(52) U.S. Cl. ..................... 152/527; 152/531
(58) Field of Classification Search ............... 152/527, 152/531, 533
See application file for complete search history.

(56) References Cited

U.S. PATENT DOCUMENTS

| | | | |
|---|---|---|---|
| 4,498,514 A | 2/1985 | Maathuis et al. | |
| 4,791,973 A | 12/1988 | Davisson | |
| 4,832,102 A * | 5/1989 | Domchick | 152/527 |
| 4,895,692 A | 1/1990 | Laurent et al. | |
| 5,407,701 A * | 4/1995 | Reuter | 152/531 X |
| 5,795,417 A | 8/1998 | Damke et al. | |
| 5,894,875 A | 4/1999 | Masaki et al. | |
| 6,000,454 A | 12/1999 | Barody et al. | |
| 6,224,808 B1 | 5/2001 | Essinger et al. | |
| 6,234,227 B1 | 5/2001 | Bosseaux | |
| 6,460,587 B1 | 10/2002 | Herbelleau | |
| 6,533,012 B1 * | 3/2003 | Jardine et al. | 152/527 |
| 2004/0089392 A1 * | 5/2004 | Yukawa et al. | 152/533 |

FOREIGN PATENT DOCUMENTS

| | | |
|---|---|---|
| EP | 0200055 | 11/1986 |
| EP | 0242840 | 10/1987 |
| EP | 0287496 | 10/1988 |
| EP | 0752325 | 1/1996 |
| EP | 0698510 | 2/1996 |
| EP | 0718090 | 5/1996 |
| JP | 10138708 | 5/1998 |
| WO | 9747463 | 12/1997 |
| WO | 9900260 | 1/1999 |

* cited by examiner

Primary Examiner—Adrienne C. Johnstone
(74) Attorney, Agent, or Firm—Buchanan Ingersoll PC

(57) ABSTRACT

A tire comprising a crown, two sidewalls and two beads, a casing reinforcement anchored in each of the beads and a crown reinforcement, the crown reinforcement comprising radially, from the inside outwards, a working block and a protective block having at least one ply of circumferentially oriented parallel reinforcing threads, characterized in that the protective block ply consists of aromatic polyamide reinforcing threads with an initial modulus of less than 1000 cN/tex and a tenacity of greater than 65 cN/tex.

17 Claims, 4 Drawing Sheets

US 7,032,638 B2

TIRE WITH A PROTECTIVE CROWN PLY MADE OF VERY HIGH TWIST ARAMID FIBER

CROSS-REFERENCE TO RELATED APPLICATIONS

This is a continuation of international application No. PCT/EP01/08430 filed Jul. 20, 2001, which was published in French on Jan. 31, 2002 as WO 02/07994 and which claims priority of French application No. 00/09699 filed Jul. 24, 2000.

BACKGROUND OF THE INVENTION

1. Technical Field of the Invention

The present invention relates to tires with a radial casing reinforcement, and particularly to the protection of the crown reinforcement of such tires.

2. The Related Art

Tires intended to be driven under difficult conditions, for example on surfaces with stones or sharp objects, usually have a crown reinforcement comprising a working block and a radially external protective block. The working block is designed to take up the forces resulting from inflating and rolling of the tire. The protective block is designed to protect the plies of the working block against damage caused by impacts and perforations suffered during use, and comprises at least one ply of parallel reinforcing threads. These reinforcing threads often have an elongation at break which is higher than that of the working plies they protect.

To improve the fatigue strength of the crown reinforcement of such a tire, patent application WO 99/00260 (U.S. Pat. No. 6,460,587) discloses a tire comprising a crown, two sidewalls and two beads, a casing reinforcement anchored in the two beads and a crown reinforcement, the crown reinforcement comprising radially, from the inside outwards, a working block and a protective block with at least one ply of substantially circumferentially oriented parallel reinforcing threads, in which the protective ply consists of elastic metallic reinforcing threads. In this tire, the working block ply adjacent to the protective ply consists of inextensible metallic reinforcing threads.

SUMMARY OF THE INVENTION

An object of the invention is to provide a tire structure which also enables the fatigue strength of the crown reinforcement to be substantially improved, and in particular in the case of aircraft tires.

In the text hereinbelow, the term:

"yarn count" means the mass in grams of one thousand meters of a reinforcing thread; the yarn count is expressed in tex; the stress suffered by a reinforcing thread, its tenacity (breaking force divided by the yarn count) and the modulus of the reinforcing thread are expressed in "cN/tex", cN meaning centi-newtons; the elongation at break is indicated as a percentage;

"reinforcing thread" means any reinforcing element in the form of a yarn capable of reinforcing a given matrix, for example a rubber matrix; examples of reinforcing threads which will be mentioned are multifilament fibers ("multifilament yarns"), these fibers possibly being twisted about themselves or otherwise, individual yarns such as monofilaments of high elemental diameter, with or without twisting about themselves, cords or plied yarn obtained by cabling or plying these single yarns or these fibers, such reinforcing threads possibly being hybrids, that is to say composites, comprising components of different nature;

"plied yarn" (or "folded yarn") means a reinforcing thread consisting of two or more single yarns assembled together by plying operations; these single yarns, generally formed from multifilament fibers, are first individually plied in one direction (S or Z twist direction) during a first plying step, and are then twisted together in the opposite direction (Z or S twist direction, respectively) during a second plying step;

in order to determine the value of the helix angle of the plied yarn under consideration obtained during the second plying step, the following formula is used (for uniform assemblies):

$$tg\gamma = \frac{N \times \sqrt{T}}{10^4 \times \sqrt{\frac{10 \times d}{4\pi}} \times \cos[(n-2)\frac{\pi}{6}]}$$

in which:

N is the twist applied to the set of single yarns in turns per meter,

T is the yarn count of a single yarn in tex, d is the density of the reinforcing thread under consideration; aramid has a density of 1.44, n is the number of single yarns in the plied yarn under consideration, and γ is the helix angle, expressed in degrees;

"adhesive-coated reinforcing thread" means a reinforcing thread which has undergone a suitable coating treatment, known as sizing or adhesive coating, capable of making the reinforcing thread bond, after a suitable heat treatment, to the matrix for which it is intended;

"axial" means a direction parallel to the axis of rotation of the tire; this direction may be "axially internal" when it is directed towards the tire and "axially external" when it is directed away from the tire;

"radial" means a direction perpendicular to the axis of rotation of the tire and passing through it; this direction may be "radially internal" or "radially external" depending on whether it is directed towards the axis of rotation of the tire or away from the tire;

the "modulus of elasticity" of a rubber mixture means the secant tensile modulus at 10% strain and at ambient temperature;

"inextensible metallic reinforcing thread" means a reinforcing thread with a relative elongation of less than 0.2% measured at 10% of its breaking force;

"elastic metallic reinforcing thread" means a reinforcing thread with a relative elongation of greater than 0.5% measured at 10% of its breaking force;

"a circumferentially oriented reinforcing thread" means a reinforcing thread oriented substantially parallel to the circumferential direction of the tire, that is to say, forming with this direction an angle not differing by more than five degrees from the circumferential direction; and "a radially oriented reinforcing thread" means a reinforcing thread substantially contained in the same axial plane or in plane forming with an axial plane an angle of less than or equal to 10°.

The mechanical properties of the reinforcing threads are determined on reinforcing threads which have been subjected to a preconditioning operation. The term "preconditioning operation" means the storage of the reinforcing threads for at least 24 hours, before measurement, in a standard atmosphere according to European standard DIN EN 20139 (temperature of 20±2° C.; hygrometry of 65±2%).

The expression "initial modulus" of a reinforcing thread, after it has been subjected to an initial tension equal to the half-sum of the yarn counts of each of the elementary single yarns (that is to say, an initial tension of 0.5 cN/tex), means the secant modulus measured on the reinforcing thread, under the same conditions as the conditioning, at a strain of 0.7%; the samples have an initial length of 400 mm and the tensile speed is 200 mm/min (or 50 mm/min when the elongation at break is less than 5%); the modulus and stress measurements are understood as being the average of ten samples. The initial modulus of a reinforcing thread is usually determined with a precision of the order of ±10%.

The tire according to the invention comprises a crown, two sidewalls and two beads, a casing reinforcement anchored in each of the beads and a crown reinforcement. The crown reinforcement comprises radially, from the inside outwards, a working block and a protective block. The protective block has at least one ply of circumferentially oriented parallel reinforcing threads. This tire is characterized in that the ply of the protective block consists of aromatic polyamide reinforcing threads with an initial modulus of less than 1000 cN/tex and a tenacity of greater than 65 cN/tex.

Preferably, the initial modulus of the aromatic polyamide reinforcing threads of the protective block ply is less than or equal to 500 cN/tex.

A subject of the invention is also a tire comprising a crown, two sidewalls and two beads, a casing reinforcement anchored in each of the beads and a crown reinforcement. The crown reinforcement comprises radially, from the inside outwards, a working block and a protective block. The protective block has at least one ply of circumferentially oriented parallel reinforcing threads. This tire is characterized in that the ply of circumferentially oriented parallel reinforcing threads consists of aromatic polyamide reinforcing threads which are such that the helix angle of the reinforcing threads is greater than 28 degrees.

Such aromatic polyamide reinforcing threads have a "bimodular" force-elongation curve. That is to say, at small elongations, the initial tensile modulus of the reinforcing thread is low, less than 1000 cN/tex, or even less than 500 cN/tex, whereas above this value, the force-elongation curve straightens up very substantially. Consequently, the protective crown ply according to the invention takes up none or virtually none of the hooping forces of the tire crown on inflation and on centrifugation. These forces are taken up by the crown ply or plies of the working block. The reinforcing threads of the protective crown ply according to the invention are not placed under tension during normal functioning of the tire, and they may thus fulfil their protective function during passage over a sharp or blunt object such as a pebble or a stone. They fulfil this function very well on account of their high tenacity coupled with the excellent breaking strength properties of the aromatic polyamide reinforcing threads.

It should also be noted that this protective crown ply whose reinforcing threads are made of aromatic polyamide with a very high helix angle, affords excellent adhesion of the protective block to the working block. Specifically, a substantial improvement is found in the tests at very high speed.

Preferably, the helix angle of the reinforcing threads is less than or equal to 38 degrees. The reason for this is that above this value of the helix angle, it becomes very difficult to implement the reinforcing threads on account of twisting phenomena.

The preferred range of helix angle values for the reinforcing threads is between 31 and 38 degrees. Moreover, to preserve the bimodular nature of the reinforcing threads during their adhesive-coating treatment, it is preferable to keep the applied tension below 3 cN/tex and, better still, below 1.5 cN/tex.

In this range of helix angle values, it is found that by diagrammatically representing the force-elongation curve for the reinforcing threads obtained by two tangents, one initially corresponding to the initial tensile modulus and the other in the breaking zone, the point of intersection of the two tangents may be defined as the transition point A of the reinforcing thread. This transition point is between 5% and 8% elongation, which is very appreciably greater than the elongation at break of a common aromatic polyamide reinforcing thread, which is in the region of 4% to 5%.

The yarn counts of the reinforcing threads used in the protective block of the tire according to the invention are preferably greater than 600 tex.

Advantageously, the crown reinforcement of the tire according to the invention is such that the protective block ply composed of circumferentially oriented reinforcing threads is radially externally adjacent to a ply of circumferentially oriented parallel reinforcing threads of the working block.

Advantageously, this working block ply comprises reinforcing threads with an initial modulus of greater than 1800 cN/tex. These reinforcing threads may be made of aromatic polyamide with helix angles of less than 26 degrees. The elongation at break of such reinforcing threads is in the region of 4% to 5%.

The crown reinforcement of the tire according to the invention is such that the forces caused by inflation and centrifugation are correctly taken up by the working block plies, since the transition point A of the reinforcing threads constituting the protective ply is above the elongation at break of the reinforcing threads constituting the adjacent reinforcing ply, of circumferential orientation, of the working block.

Preferably, the protective block ply extends axially beyond the working block on either side of the midplane of the tire.

A subject of the invention is also an aircraft tire comprising a crown, two sidewalls and two beads, a casing reinforcement anchored in each of the beads and a crown reinforcement, the crown reinforcement comprising radially, from the inside outwards, a working block and a protective block having at least one ply of substantially circumferentially oriented parallel reinforcing threads, characterized in that the protective block ply consists of aromatic polyamide reinforcing threads which are such that the helix angle of these reinforcing threads is greater than 28 degrees.

The invention also relates to a heavy goods vehicle tire comprising a crown, two sidewalls and two beads, a casing reinforcement anchored in each of the beads and a crown reinforcement, the crown reinforcement comprising radially, from the inside outwards, a working block and a protective block having at least one ply of substantially circumferentially oriented parallel reinforcing threads, characterized in that the protective block ply consists of aromatic polyamide reinforcing threads which are such that the helix angle of the reinforcing threads is greater than 28 degrees.

BRIEF DESCRIPTION OF THE DRAWINGS

Examples of implementation of the invention in the case of aircraft tires are described below with the aid of the attached drawings, in which.

DETAILED DESCRIPTION OF EXEMPLARY EMBODIMENTS

Figure 1:
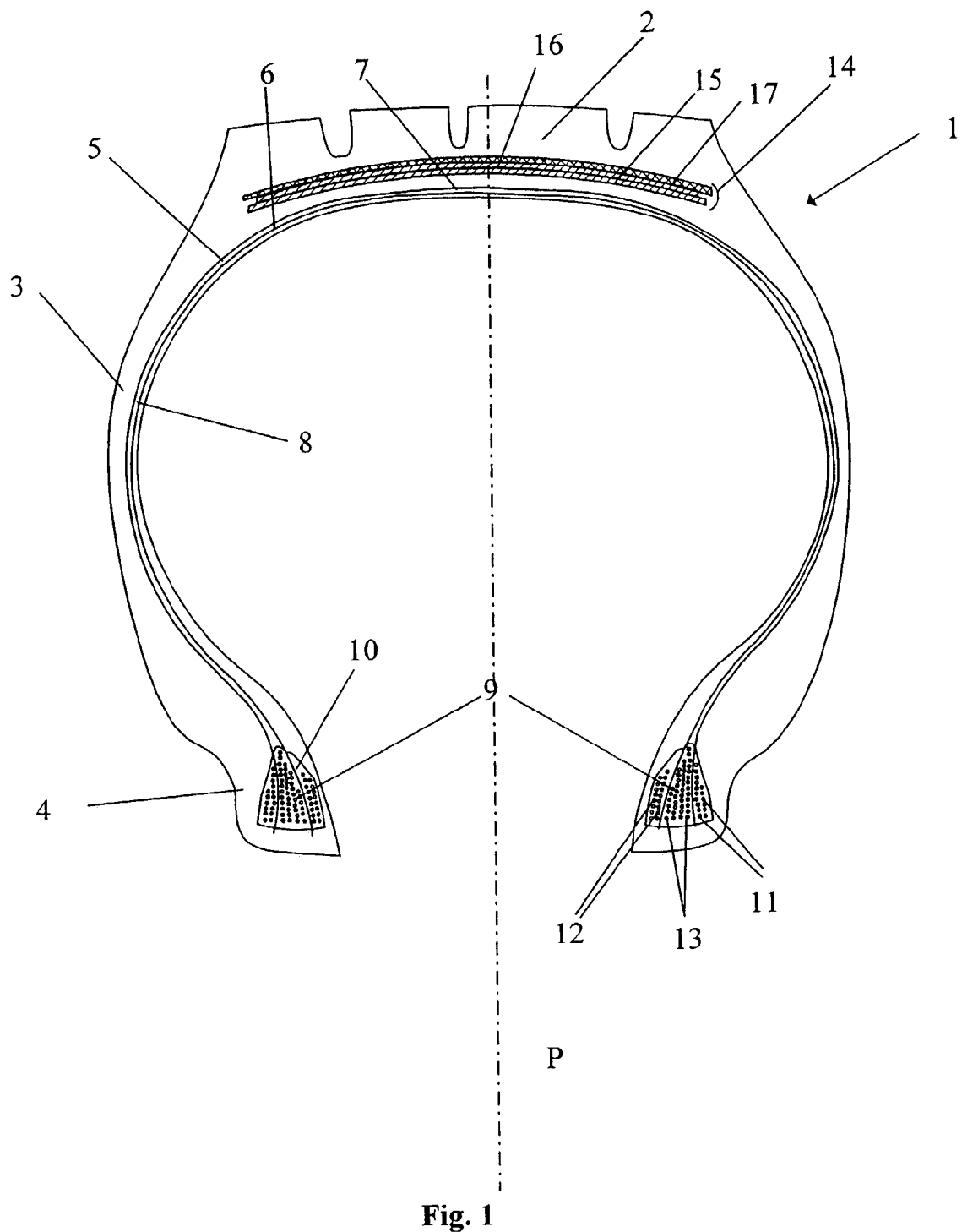
FIG. 1 diagrammatically shows, viewed in axial cross section, one embodiment of a tire according to the invention.

The aircraft tire 1 diagrammatically represented in axial cross section in FIG. 1 comprises a crown 2, two sidewalls 3 and two beads 4. A casing reinforcement 5 extends from one bead to the other and consists of two circumferential alignments 6 and 7 of first reinforcing threads. The circumferential alignments of the first reinforcing threads 6 and 7 are substantially radially oriented in the sidewalls 3 and consist of reinforcing threads made of aromatic polyamide or aramid. The first reinforcing threads 6 and 7 are arranged in parallel and are separated by a layer of mixture 8 whose nature and modulus are adapted as a function of their position in the tire.

FIG. 1 also shows a first example of a crown reinforcement 14. This reinforcement consists of a working block and a protective block. The protective block comprises a ply 17 consisting of reinforcing threads made of aromatic polyamide with a helix angle of between 28 and 38 degrees and a yarn count of greater than 600 tex. The working block comprises two plies of reinforcing threads 15 and 16 of substantially circumferential orientation obtained by helical winding of at least one reinforcing thread. This working block reinforcement comprises reinforcing threads made of aromatic polyamide or aramid. The reinforcing threads have an initial modulus of greater than 1800 cN/tex and the aramid plied yarns have a helix angle of less than 26 degrees.

The number of plies of reinforcing threads in the working block and also the laying pitch are adapted as a function of the size of the tire and its conditions of use. This embodiment of a crown reinforcement has the advantage of affording a very efficient hooping which minimizes the variation of the dimensions of the tire during inflation and also at high speed. It is found that the change in the profile may be three to four times lower than for a common aircraft tire such as a 30–7.7R16 AIRX. This excellent hooping also has the advantage of not placing under high extension the mixtures constituting the crown tread of the tire. Surface cracks in the tread caused by the ozone present in the air are greatly reduced.

It is also been found that the adhesion of the ply 17 of the protective block to the adjacent ply 16 is excellent.

Figure 2:
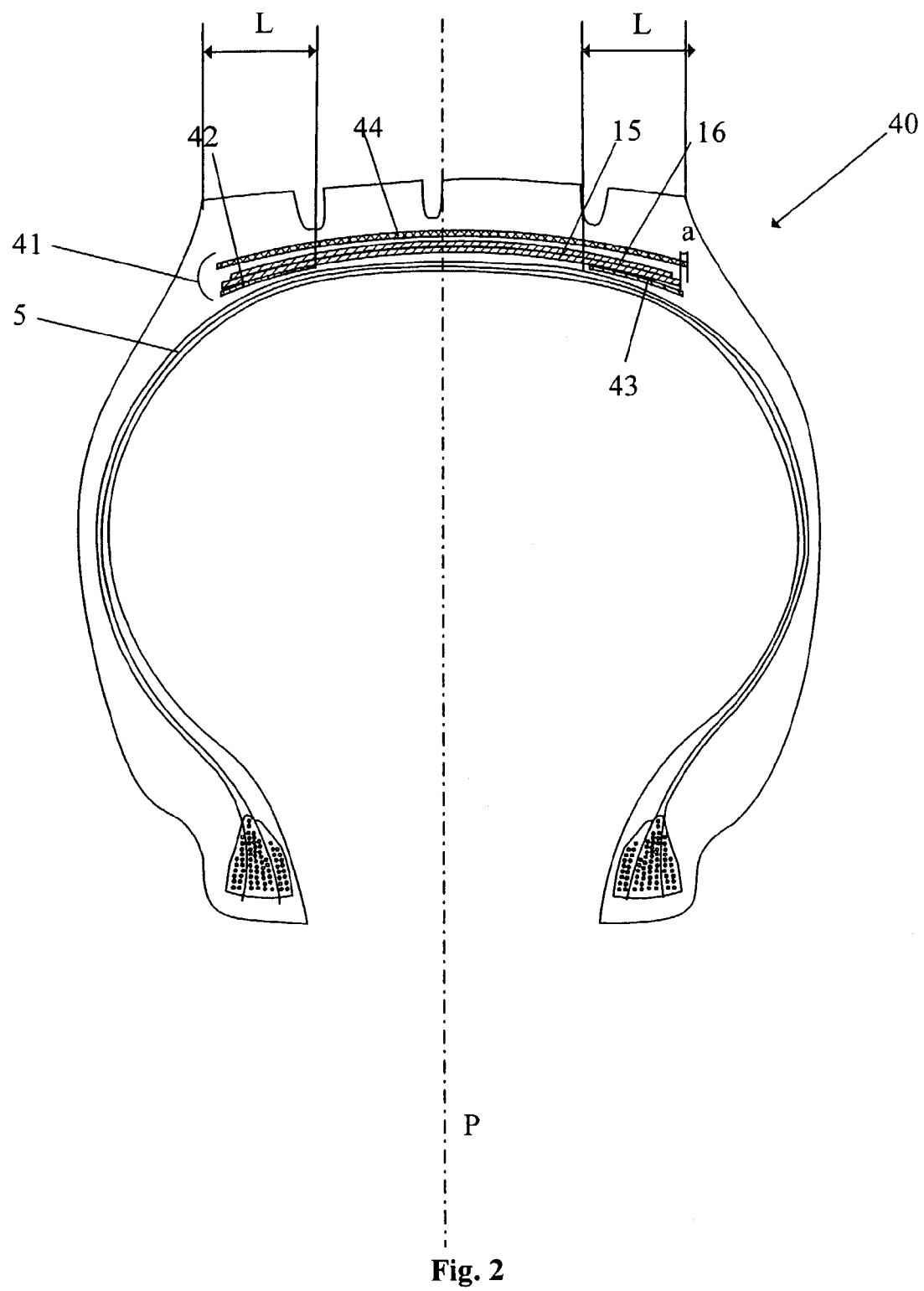
FIG. 2 is a cross-sectional view similar to FIG. 1, showing a second embodiment of the invention.

The crown reinforcement 41 of the tire 40 shown in FIG. 2 comprises, as above, two substantially circumferentially oriented reinforcing plies 15 and 16 and is completed with two layers 42 and 43 of reinforcing elements with an initial modulus of greater than 1800 cN/tex, substantially circumferentially oriented, arranged axially on either side of the midplane of the tire in the lateral zones L of the crown. These layers 42 and 43 also consist of aromatic reinforcing threads with an initial modulus of greater than 1800 cN/tex. They allow the hooping of the lateral zones L of the crown to be reinforced. The layers 42 and 43 are arranged radially between the plies 15 and 16 and the casing reinforcement 5.

The reinforcement 41 is also completed by a protective crown ply 44 arranged radially externally relative to the other plies of the crown reinforcement 41. This protective crown ply 44 consists, as above, of substantially circumferentially oriented very high twist aramid reinforcing threads. It should be noted that this protective ply extends axially beyond the plies 15 and 16 on either side of the midplane P of the tire by an axial distance a.

Figure 3:
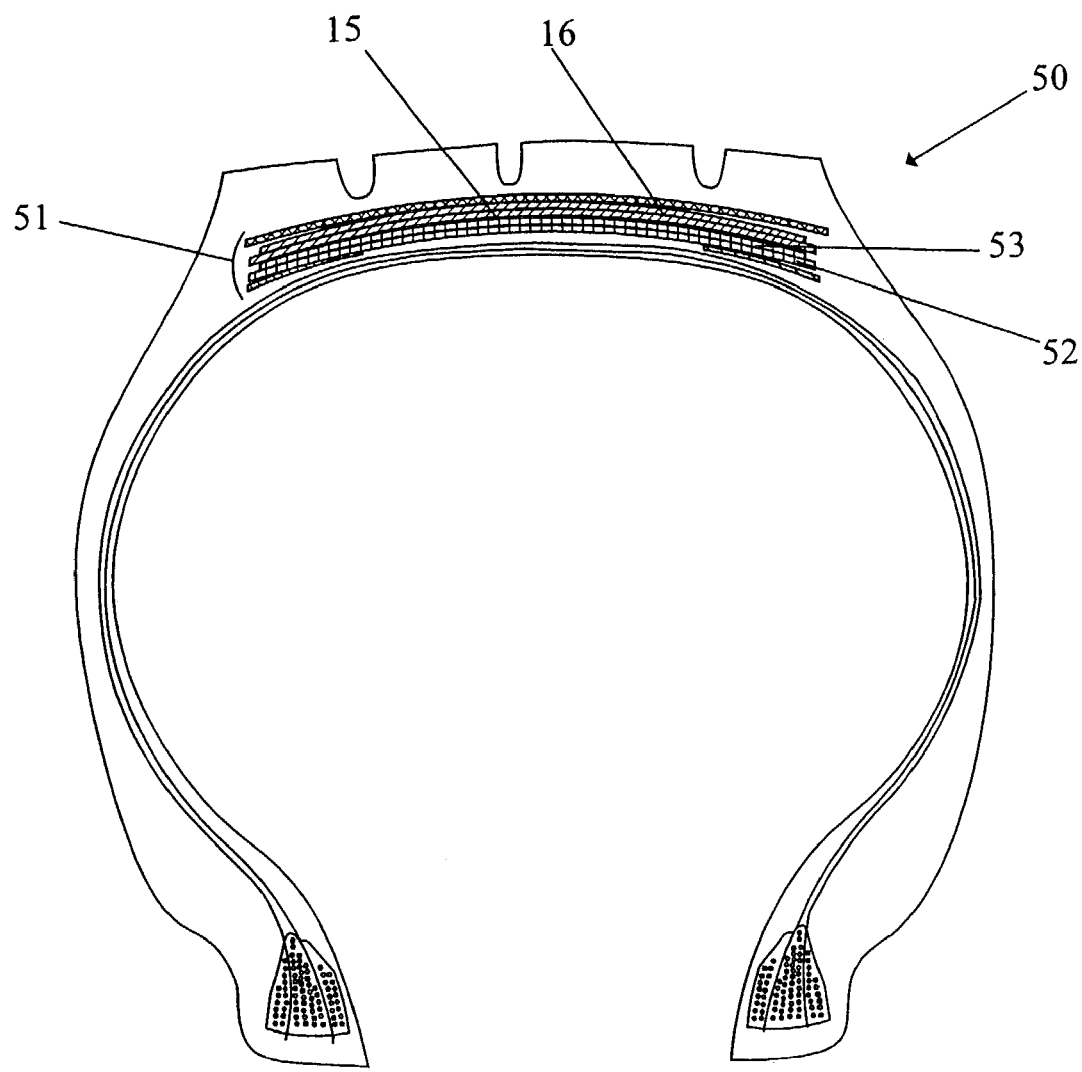
FIG. 3 is a cross-sectional view similar to FIG. 1, showing a third embodiment of the invention.

FIG. 3 shows a tire 50 with a crown reinforcement 51 additionally comprising two reinforcing plies 52, 53, parallel to each other in each ply and crossed from one ply to the next, forming, with the circumferential direction an angle α of between 5 and 35 degrees, the reinforcing threads having an initial modulus of greater than 1800 cN/tex. These reinforcing threads may also be made of aromatic polyamide with a helix angle of less than 26 degrees. These two plies are arranged radially below the circumferential reinforcing plies 15 and 16. They increase the cornering force of the tire 50 relative to that of the tire 40. This tire is particularly suitable for use as a steering tire or small-wheel tire of an aircraft. A similar structure is also applicable for heavy goods vehicle tires.

In the three examples presented, the anchoring of the two circumferential alignments 6 and 7 is provided in the beads 3 by alignments or "stacks" 9 of second circumferentially oriented reinforcing threads arranged axially on either side of each circumferential alignment of the first reinforcing threads 6 and 7. Each alignment or stack 9 of second reinforcing threads may be obtained by helical winding of a reinforcing thread. The first reinforcing threads 6 and 7, which are radial, and the second reinforcing threads, which are circumferential, are separated from each other by a layer of rubber mixture 10 with a very high modulus of elasticity to prevent any direct contact of one reinforcing thread with another. The lateral adhesion between each circumferential alignment 6 and 7 and the stacks 9 of circumferential reinforcing threads makes it possible to take up the tension which develops in these first reinforcing threads during inflation of the tire 1. This bead structure ensures excellent anchoring which remains very efficient even for the very high inflation pressures of aircraft tires, of greater than 12 bar and possibly as much as 25 bar in certain specific applications.

The stacks 9 of second reinforcing threads are distributed in three groups, two stacks 11 arranged axially externally relative to the casing reinforcement 5 on the outer side of the tire, two stacks 12 arranged axially internally relative to the casing reinforcement 5, on the inner side of the tire, and 4 stacks 13 arranged between the two circumferential alignments 6 and 7 of the casing reinforcement 5.

The crown reinforcement of the tires according to the invention may also be used with casing reinforcements usually anchored in the beads by means of a turn-up around a bead wire.

Figure 4:
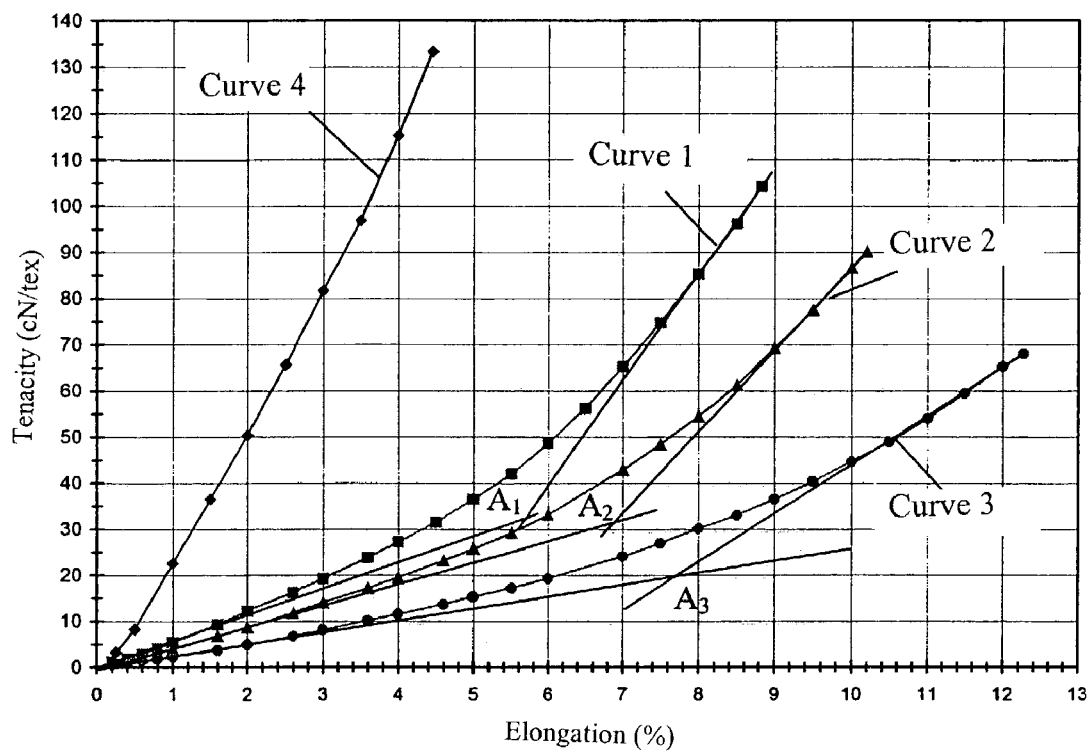
FIG. 4 is a graph of the force-elongation curves for several reinforcing threads.

FIG. 4 shows the force-elongation curves for four reinforcing threads made of aromatic polyamide which are used in the tires according to the invention:

curve 1 corresponds to an adhesive-coated plied yarn with a helix angle of 31.5 degrees;
curve 2 corresponds to an adhesive-coated plied yarn with a helix angle of 34 degrees;
curve 3 corresponds to an adhesive-coated plied yarn with a helix angle of 38 degrees; and curve 4 corresponds to an adhesive-coated plied yarn with a helix angle of 21 degrees.

The curves show on the x-axis the elongation of the plied yarn in % and on the y-axis the ratio between the force applied and the yarn count of the plied yarn, which corresponds to the tenacity in cN/tex.

Curve 4 corresponds to an adhesive-coated plied yarn with a yarn count of 735 tex produced from two identical aramid single yarns of 330 tex individually overtwisted to 230 turns per meter and then simultaneously plied to 230 t/m in the opposite direction, which gives it a helix angle of 21 degrees. The elongation at break is 4.45% and the initial modulus is 2000 cN/tex. The tenacity of this plied yarn is 133 cN/tex.

Curve 1 corresponds to an adhesive-coated plied yarn with a yarn count of 1235 tex produced from three identical aramid single yarns of 330 tex individually overtwisted to 310 turns per meter and then simultaneously plied to 310 t/m in the opposite direction, which gives it a helix angle of 31.5 degrees. The elongation at break is 8.8%, the initial modulus is in the region of 480 cN/tex and the tenacity is 104 cN/tex. The force-elongation curve for this plied yarn shows pronounced bimodular nature with a transition point A1 in the region of 5.7%.

Curve 2 corresponds to an adhesive-coated plied yarn with a yarn count of 1291 tex produced from three identical aramid single yarns of 330 tex individually overtwisted to 350 turns per meter and then simultaneously plied to 350 t/m in the opposite direction, which gives it a helix angle of 34 degrees. The elongation at break is 10.2%, the initial modulus is in the region of 330 cN/tex and the tenacity is 90 cN/tex. The transition point A2 of the force-elongation curve is in the region of 6.9%.

Curve 3 corresponds to an adhesive-coated plied yarn with a yarn count of 1371 tex produced from three identical aramid single yarns of 330 tex individually overtwisted to 390 turns per meter and then simultaneously plied to 390 t/m in the opposite direction, which gives it a helix angle of 38 degrees. The elongation at break is 12.3%, the initial modulus is in the region of 165 cN/tex and the tenacity is 68 cN/tex. The transition point A3 of the force-elongation curve is in the region of 7.7%.

The plied yarns according to the invention were adhesive-coated in the usual manner with two successive baths, the first, a pre-adhesive coating bath, applies an adhesive of epoxy type, and the second applies an adhesive of RFL type. The treatment tension during the first bath was 1 cN/tex and 0.6 cN/tex during the second bath. The treatment temperature was in the region of 230° C.

These force-elongation curves clearly show the change in Behavior associated with increasing the twist of the plied yarns. Curves 1–3 show pronounced bimodular Behavior with a transition point A which is found at an elongation which increases as the helix angle increases.

Figure 5:
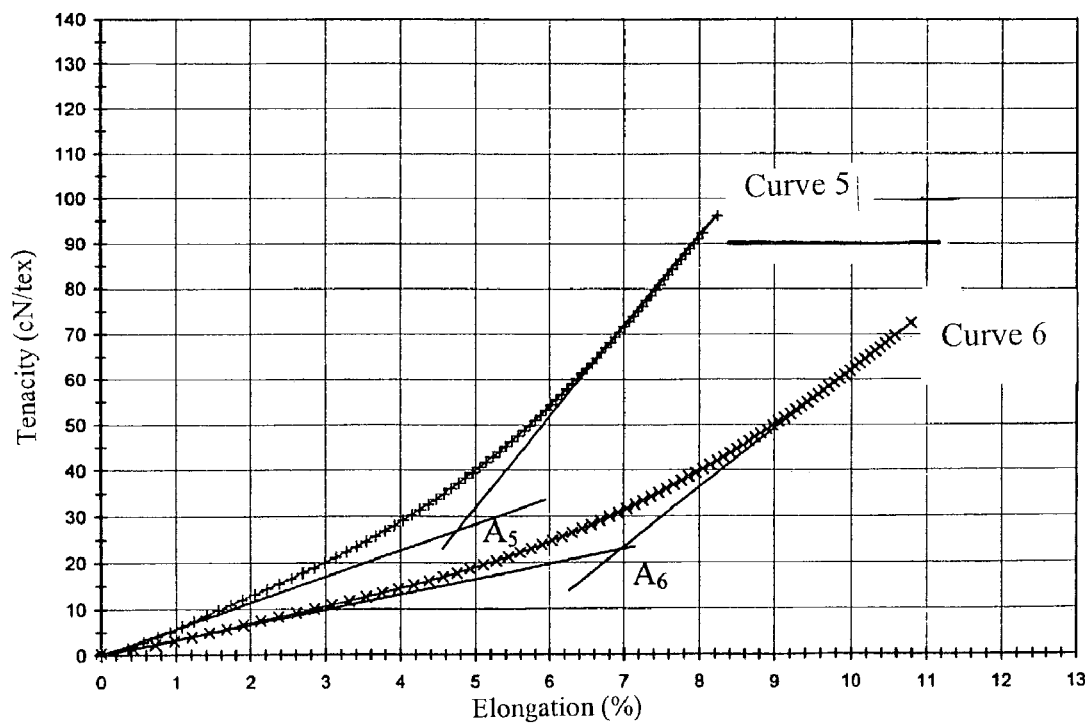
FIG. 5 is a graph of the force-elongation curves for two additional reinforcing threads.

FIG. 5 shows the force-elongation curves for two reinforcing threads according to the invention. Curve 5 corresponds to an adhesive-coated plied yarn with a yarn count of 791 tex produced from two identical aramid single yarns of 330 tex individually overtwisted to 360 turns per meter and then simultaneously plied to 360 turns per meter in the opposite direction, which gives it a helix angle of 31.5 degrees. The elongation at break is 8.2%, the initial modulus is in the region of 500 cN/tex and the tenacity is 96 cN/tex. The transition point A5 is 4.7%. Behavior similar to that of the plied yarn of curve 1 is found.

Curve 6 corresponds to an adhesive-coated plied yarn with a yarn count of 848 tex produced from two identical aramid single yarns of 330 tex individually overtwisted to 450 turns per meter and then simultaneously plied to 450 turns per meter in the opposite direction, which gives it a helix angle of 37.5 degrees. The elongation at break is 10.8%, the initial modulus is in the region of 300 cN/tex and the tenacity is 72 cN/tex. The transition point A6 is 6.9%. Behavior similar to that of the plied yarn of curve 3 is found.

Testing was carried out on a tire according to the invention of size 30–7.7R16 comprising:

as casing reinforcement, three circumferential alignments of first reinforcing threads consisting of adhesive-coated plied yarns with a yarn count of 501 tex produced from three identical aramid single yarns of 167 tex; the density of the first reinforcing threads is 88 f/dm in the region of the beads;

as second reinforcing threads, steel monofilaments with a diameter of 0.98 mm and distributed into 13 stacks 9:
  I. 3 stacks axially innermost with 14, 17 and 20 turns,
  II. 4 stacks between the first and second circumferential alignments with 10, 14, 16 and 20 turns,
  III. 3 stacks between the second and third circumferential alignments with 19, 15 and 10 turns, and
  IV. 3 stacks axially outermost with 14, 10 and 7 turns, a crown reinforcement with:
  V. 3 plies of substantially circumferentially oriented reinforcing threads consisting of adhesive-coated plied yarns with a yarn count of 735 tex produced from two identical aramid single yarns of 330 tex (curve 4); the reinforcing threads have a laying pitch of 1.2 mm; and
  VI. a protective ply consisting of reinforcing threads with a helix angle of 38 degrees corresponding to the reinforcing thread of the force-elongation curve 6.

The layer of mixture with a very high modulus of elasticity had a secant tensile modulus of 45 MPa and a Shore A hardness of 90.

This tire underwent bursting strength tests and the maximum pressures measured were in the region of 100 bar. It is also characterized by a degree of elongation of its development, between zero pressure and its running pressure of 15 bar, in the region of 1.5%. This tire also successfully underwent taking off tests similar to the standardized tests for the approval of aircraft tires.

This tire was compared with a tire of common structure comprising nylon reinforcing threads for the casing reinforcement and a crown reinforcement with several hooping plies also composed of nylon reinforcing threads and a protective metallic crown ply. This protective ply was composed of metallic reinforcing threads laid with undulations in the plane of the crown in order to achieve the greatest possible efficiency.

The test performed corresponds to driving the tires on a testing drum comprising a series of hemispherical indenters of a suitable size to damage the crown reinforcement of the tires. The two tires tested showed virtually identical strength. Consequently, the protective crown ply according to the invention has the advantage of offering the same indentation strength as a conventional metallic ply while at the same time affording much better resistance to oxidation of the crown reinforcement.

The tire according to the invention may be advantageously manufactured on a rigid core which imposes the shape of its inner cavity, such as those described in EP 242 840 (U.S. Pat. No. 4,895,692) or EP 822 047 (U.S. Pat. No. 6,224,808), the subjects matter of which are hereby incorporated by reference. All constituents of the tire are applied onto this core, in the order required for the final structure, and are arranged directly in their final position, without undergoing shaping at any stage in the manufacture. The curing is carried out on the core, which is removed only after the vulcanization stage.

This manufacturing method has the advantage of greatly reducing or even eliminating the prestresses imposed on the reinforcing threads, particularly those oriented at 0°, during the conventional shaping stages.

The outer casing on the core can also be partially cooled in order to maintain the reinforcing threads in the state of strain imposed during laying.

Equally, the tire can also be manufactured on a drum as described in WO 97/47463 (U.S. Pat. No. 6,234,227) or EP 0 718 090 (U.S. Pat. No. 6,000,454), the subjects matter of which are hereby incorporated by reference, provided that the tire blank is shaped before laying the circumferentially oriented reinforcing threads.

The circumferentially oriented reinforcing threads can also be laid on a form whose geometry is identical to the intended form in the curing mould. The crown block is then assembled with the complementary tire blank according to transfer techniques that are known to those skilled in the art, and then, still according to known principles, the tire is fitted on and placed under pressure by deploying a membrane inside the tire.

This embodiment also ensures the absence of prestresses caused by the shaping operation in the vulcanization mold.

What is claimed is:

1. A tire comprising a crown, two sidewalls and two beads, a casing reinforcement anchored in each of the beads and a crown reinforcement, said crown reinforcement comprising radially, from the inside outwards, a working block and a protective block having at least one ply of substantially circumferentially oriented parallel reinforcing-threads, wherein said at least one ply of said protective block comprises aromatic polyamide reinforcing threads with an initial modulus of less than 1000 cN/tex and a tenacity of greater than 65 cN/tex.

2. The tire according to claim 1, in which the initial modulus of the aromatic polyamide reinforcing threads is less than or equal to 500 cN/tex.

3. The tire according to claim 1, in which the tension applied to said reinforcing threads during their adhesive coating treatment is less than 3 cN/tex.

4. The tire according to claim 3, in which the tension applied to said reinforcing threads during their adhesive coating treatment is less than 1.5 cN/tex.

5. The tire according to claim 1, in which the yarn count of the reinforcing threads of said at least one ply of said protective block has a value of greater than 600 tex.

6. The tire according to claim 1, in which said at least one protective block ply is radially externally adjacent to a ply of substantially circumferentially oriented parallel reinforcing threads of said working block.

7. The tire according to claim 6, in which the reinforcing threads of said working block ply have an initial modulus of elasticity of greater than 1800 cN/tex.

8. The tire according to claim 7, in which the reinforcing threads of said working block ply are aromatic polyamide reinforcing threads with helix angles of less than 26 degrees.

9. The tire according to claim 1, in which said at least one protective block ply extends axially beyond said working block on either side of the midplane of the tire.

10. An aircraft tire comprising a crown, two sidewalls and two beads, a casing reinforcement anchored in each of the beads and a crown reinforcement, said crown reinforcement comprising radially, from the inside outwards, a working block and a protective block having at least one ply of substantially circumferentially oriented parallel reinforcing threads, wherein said at least one ply of said protective block comprises aromatic polyamide reinforcing threads with an initial modulus of less than 1000 cN/tex and a tenacity of greater than 65 cN/tex.

11. The aircraft tire according to claim 10, in which the working block of the crown reinforcement comprises at least one ply of circumferentially oriented parallel reinforcing threads with an initial modulus of elasticity of greater than 1800 cN/tex, adjacent to said at least one protective block ply.

12. The aircraft tire according to claim 11, in which, with the crown comprising a central zone and two lateral zones, the working block also comprises two layers of reinforcing elements with an initial modulus of elasticity of greater than 1800 cN/tex, circumferentially oriented and arranged axially on either side of the mid plane of the tire in the lateral zones of said crown.

13. The aircraft tire according to claim 11, in which said working block also comprises two reinforcing plies of reinforcing threads, parallel to each other in each ply and crossed from one ply to the next, forming, with the circumferential direction, an angle a of between 5 and 35 degrees, said reinforcing threads having an initial modulus of greater than 1800 cN/tex.

14. A heavy goods vehicle tire comprising a crown, two sidewalls and two beads, a casing reinforcement anchored in each of the beads and a crown reinforcement, said crown reinforcement comprising radially, from the inside outwards, a working block and a protective block having at least one ply of substantially circumferentially oriented parallel reinforcing threads, wherein said at least one ply of said protective block comprises aromatic polyamide reinforcing threads with an initial modulus of less than 1000 cN/tex and a tenacity of greater than 65 cN/tex.

15. The heavy goods vehicle tire according to claim 14, in which the working block of the crown reinforcement comprises at least one ply of circumferentially oriented parallel reinforcing threads with an initial modulus of elasticity of greater than 1800 cN/tex, adjacent to said protective block ply.

16. The heavy goods vehicle tire according to claim 15, in which, with the crown comprising a central zone and two lateral zones, the working block also comprises two layers of reinforcing elements with an initial modulus of elasticity of greater than 1800 cN/tex, circumferentially oriented and arranged axially on either side of the midplane of the tire in the lateral zones of said crown.

17. The heavy goods vehicle tire according to claim 15, in which said working block also comprises two reinforcing plies of reinforcing threads, parallel to each other in each ply and crossed from one ply to the next, forming, with the circumferential direction, an angle a of between 5 and 35 degrees, said reinforcing threads having an initial modulus of greater than 1800 cN/tex.

* * * * *